(12) United States Patent
Dawson (10) Patent No.: US 7,047,610 B2
(45) Date of Patent: May 23, 2006

(54) HOLDING DEVICE

(75) Inventor: Malcolm Bruce Dawson, Solihull (GB)

(73) Assignee: Auto Service Tools Limited (GB)

( * ) Notice: Subject to any disclaimer, the term of this patent is extended or adjusted under 35 U.S.C. 154(b) by 109 days.

(21) Appl. No.: 10/243,788

(22) Filed: Sep. 13, 2002

(65) Prior Publication Data

US 2004/0042848 A1    Mar. 4, 2004

(30) Foreign Application Priority Data

Sep. 3, 2002    (GB) .................................. 0220441

(51) Int. Cl.
*B25B 27/14*    (2006.01)

(52) U.S. Cl. ..................... 29/281.1; 29/255; 29/278; 269/249

(58) Field of Classification Search ............ 29/281.1, 29/255, 244, 278, 281.5; 269/249, 143
See application file for complete search history.

(56) References Cited

U.S. PATENT DOCUMENTS

| | | | |
|---|---|---|---|
| 3,066,368 A | 12/1962 | Czapar ........................ 24/81 |
| 4,684,357 A | 8/1987 | Hooper ...................... 474/101 |
| 5,099,563 A | 3/1992 | Strusch ...................... 29/281.5 |
| 5,222,330 A | 6/1993 | Krol ............................ 51/225 |
| 5,490,582 A | 2/1996 | Trowbridge ................ 188/2 R |
| 5,586,378 A * | 12/1996 | Smith .......................... 29/257 |
| 5,653,011 A | 8/1997 | Collins ...................... 29/281.4 |
| 5,755,029 A | 5/1998 | Learned ................. 29/888.011 |
| 5,765,902 A * | 6/1998 | Love ..................... 296/100.01 |
| 5,950,294 A | 9/1999 | Gibbs ........................ 29/281.5 |
| 6,058,585 A | 5/2000 | Soleymani ................. 29/281.6 |
| 6,302,002 B1 | 10/2001 | Defer ........................... 81/488 |
| 6,332,256 B1 | 12/2001 | Dawson ..................... 29/281.5 |
| 6,367,790 B1 * | 4/2002 | Ocklenburg et al. ........ 269/166 |
| 2004/0032070 A1 * | 2/2004 | Genduso ..................... 269/249 |

* cited by examiner

*Primary Examiner*—Lee D. Wilson
(74) *Attorney, Agent, or Firm*—MacMillan, Sobanski & Todd, LLC (57) ABSTRACT

A device for holding a rotary element stationary relative to a fixed body, the device comprising at least one element, adapted to engage with the rotary element to hold the device in a fixed position relative to the rotary element; and an engaging member, adapted to engage with the body to hold the device relative to the body.

3 Claims, 7 Drawing Sheets

HOLDING DEVICE

BACKGROUND TO THE INVENTION

1. Field of the Invention

The invention relates to a device for holding a rotary element stationary relative to a fixed body.

The invention has been devised, particularly but not exclusively, for the purpose of holding a camshaft or a fuel injection pump of an internal combustion engine stationary relative to an engine casing. Commonly, a camshaft or fuel injection pump is driven in timed relation to the engine crankshaft by a toothed drive belt (timing belt) or chain entrained around toothed pulleys or sprockets (hereafter referred to as sprockets) on the crankshaft and the drive shaft of the camshaft or fuel injection pump. In order to prevent failure in service and possible engine damage, service schedules usually specify that the timing belt be replaced at predetermined time and/or mileage intervals. It is essential, when removing the timing belt for any reason, to ensure that the timing relationship between the camshaft or fuel injection pump and the crankshaft is not lost. Therefore it is desirable to hold the camshaft and/or fuel injection pump against rotation relative to the engine casing whilst the old timing belt is removed and a new timing belt fitted.

2. Description of the Prior Art

Service tools for holding camshafts and/or fuel injection pumps against rotation are known, but as supplied by motor manufacturers they are usually specifically designed for one engine or family of engines and are not usable for other engines. If a service establishment wishes to perform such work on many different engines, but does not wish to keep a large number of special tools, there is a requirement for a more versatile holding device, which is capable of being used on a wide range of engines.

In our UK Patent No.2340539 a holding device is disclosed for the purpose of holding stationary, relative to one another, the camshafts of a double overhead camshaft internal combustion engine, or a camshaft and a fuel injection pump driving shaft of an engine, e.g. in a motor vehicle. In our U.S. Pat. No. 6,332,256 a holding device is shown for the same purpose as that of the holding device in our UK Patent No.2340539, however the holding device in our U.S. Pat. No. 6,332,256 is multi-adjustable. Neither of these devices address the problem of holding a single rotary element stationary relative to a fixed body.

SUMMARY OF THE INVENTION

It is therefore the object of the present invention to provide a device which satisfies the above requirement.

According to the present invention there is provided a device for holding a rotary element stationary relative to a fixed body, the device comprising:

holding means, adapted to engage with the rotary element to hold the device in a fixed position relative to the rotary element; and engaging means, adapted to engage with a surface of the body to hold the device relative to the body.

The holding means may comprise clamping means operable to clamp the rotary element.

The clamping means may comprise two clamping elements connected to and displaceable relative to one another to clamp the rotary element therebetween.

The clamping elements may be adapted to engage opposing radially extending faces of the rotary element, i.e. by being relatively displaced in a direction parallel to the axis of rotation of the rotary element.

Alternatively, or possibly in addition, the clamping elements may be adapted to engage opposing internal and external surfaces of a peripheral region or regions of the rotary element.

At least one of the clamping elements may comprise an engaging surface adapted to engage the periphery of the rotary element, thereby holding the device from circumferential movement relative to the rotary element.

The engaging surface may frictionally engage the periphery of the rotary element.

The engaging surface may comprise a formation adapted to engage with a formation on the rotary element, e.g. between adjacent teeth on the circumference of a toothed rotary element.

Engagement of the device with rotary elements of different thicknesses may be facilitated by providing adjustable abutment means operable between the clamping elements, to ensure the clamping elements, in use, engage squarely with the rotary elements and that over-tightening of the clamping elements is inhibited.

The engaging means may be arranged frictionally to engage the body, thereby holding the device relative to the body.

The engaging means may be adapted to urge the device away from the body.

A screw threaded element may be provided for urging the clamping elements together with sufficient force to hold the rotary element securely therebetween.

BRIEF DESCRIPTION OF THE DRAWINGS

These and other features of the invention will now be described by way of example with reference to the accompanying drawings, in which.

DESCRIPTION OF THE PREFERRED EMBODIMENTS

Figure 2:
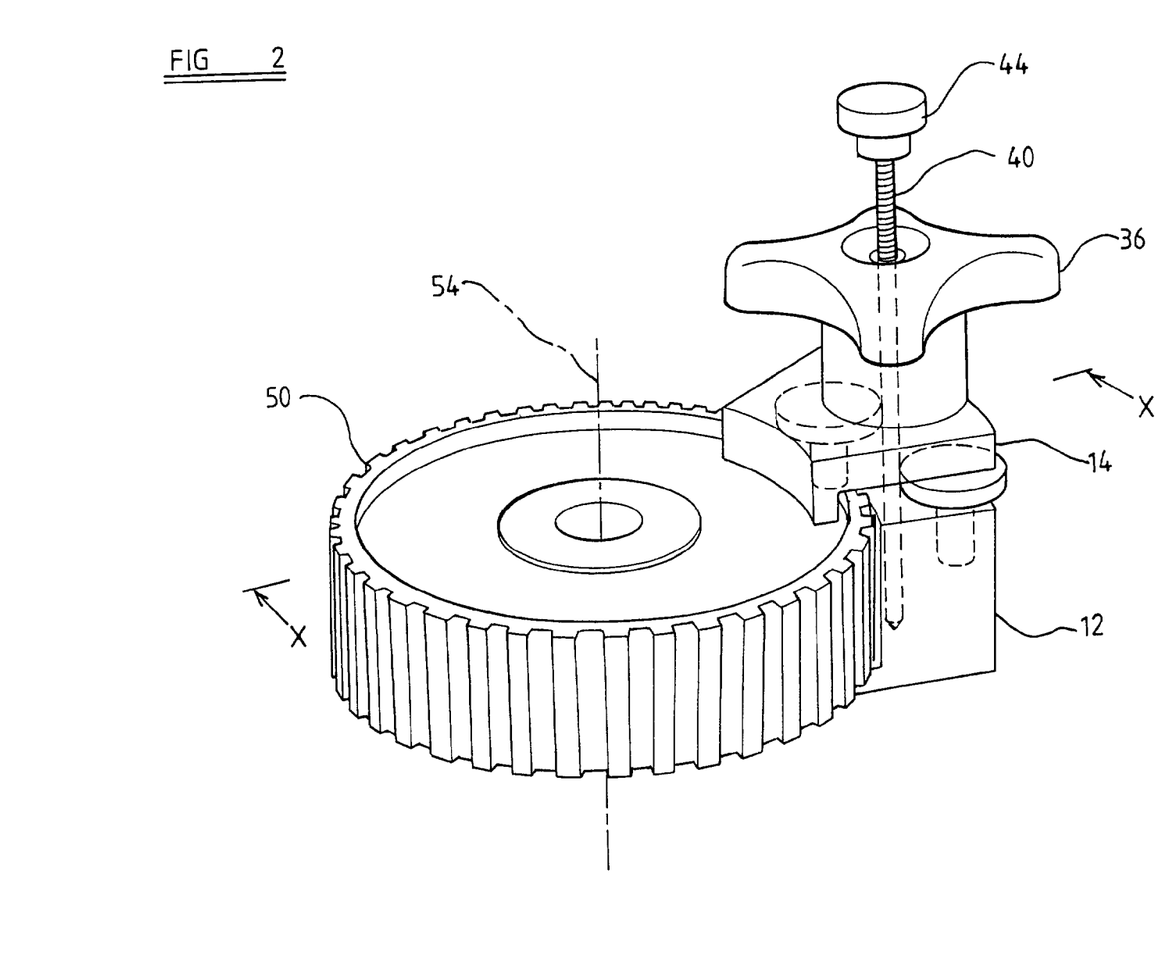
FIG. 2 is a perspective view of the holding device of FIG. 1, in use holding a rotary element.
Figure 3:
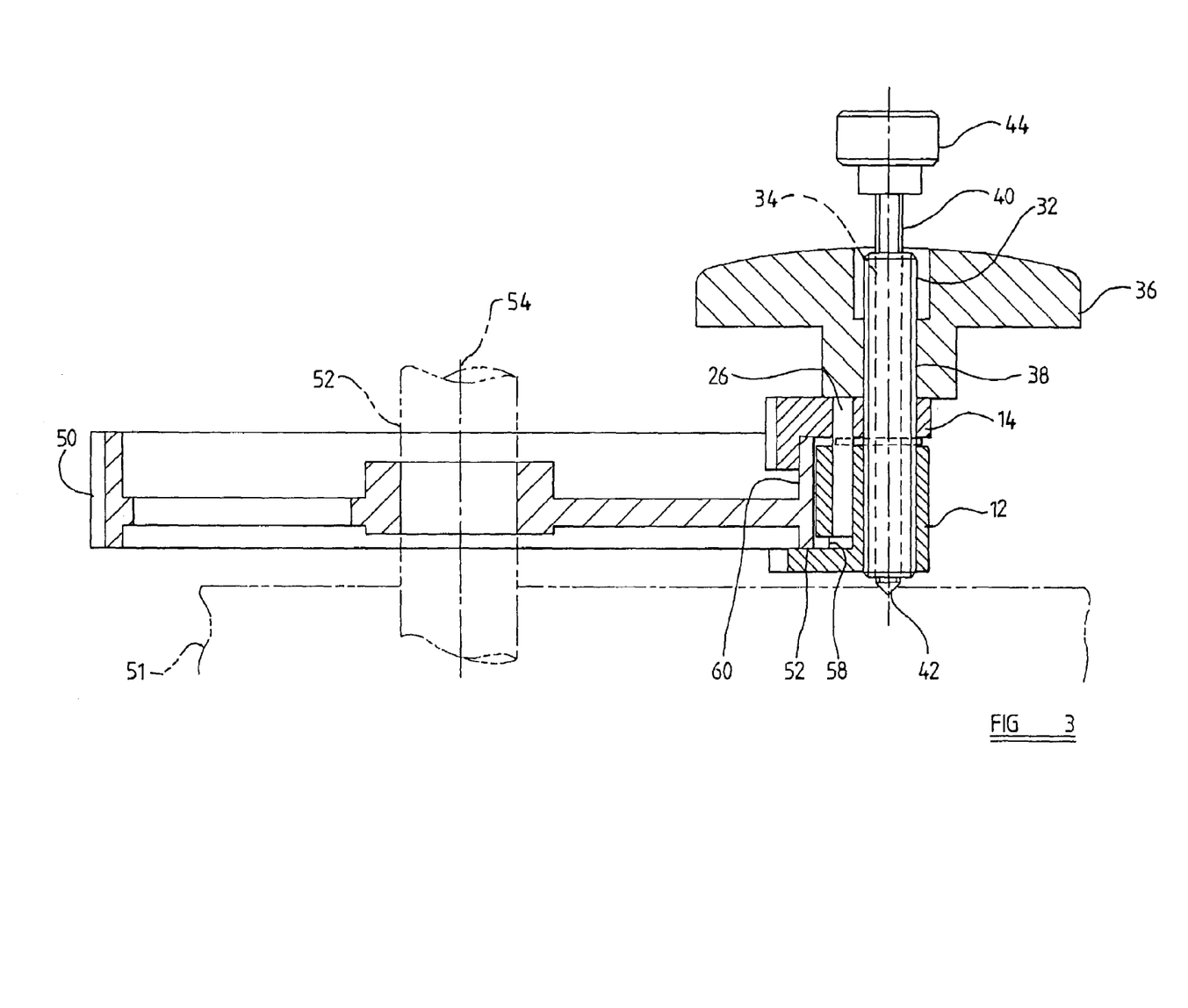
FIG. 3 is a cross-sectional view through the plane X—X of FIG. 2.

Referring firstly to FIGS. 2 and 3, there is shown a first embodiment of holding device in accordance with the invention in use with a sprocket 50. The sprocket 50 is connected to a body in the form of an engine block 51 (not shown in FIG. 2) by a shaft 52 (also not shown in FIG. 2). The shaft 52 allows for rotation of the sprocket 50 about an axis 54. References to the radial and axial directions hereinafter, unless otherwise specified, are in relation to the axis 54.

Figure 1:
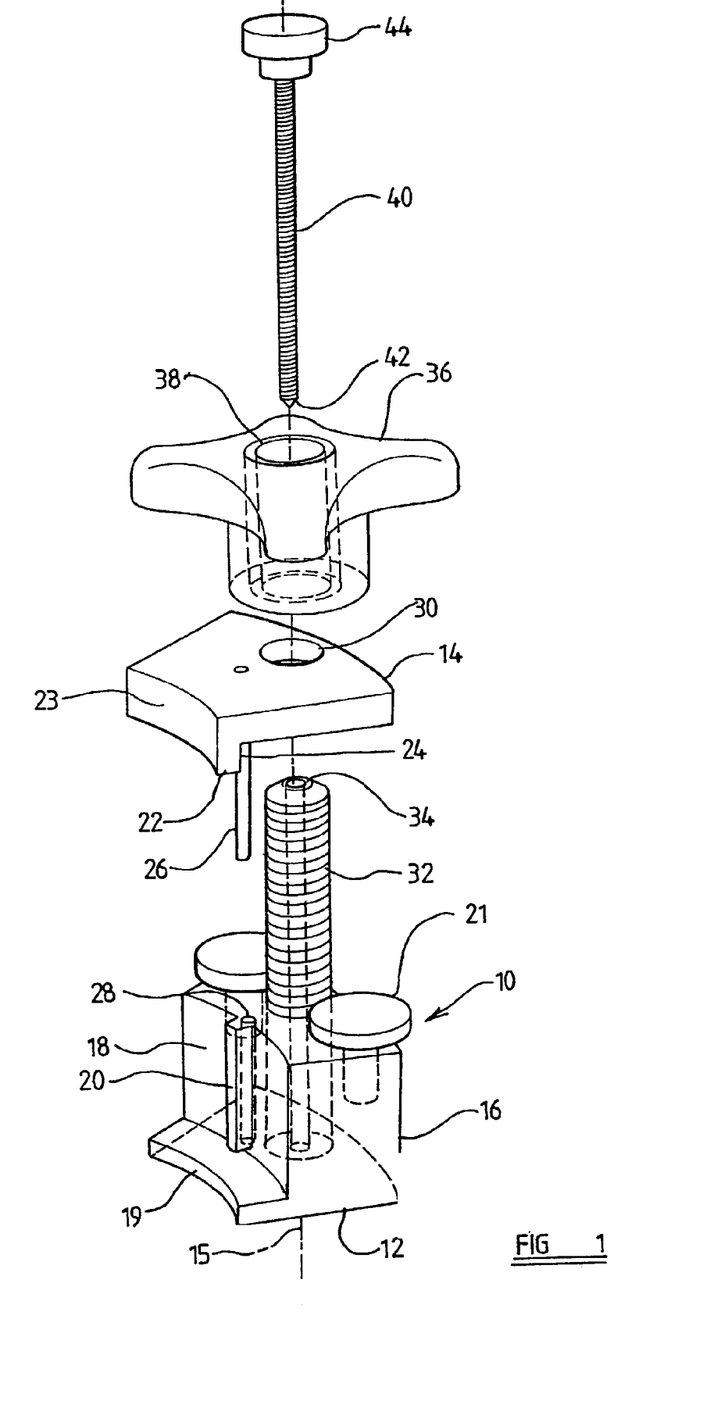
FIG. 1 is an exploded perspective view of a first embodiment of a holding device in accordance with the invention.

FIG. 1 shows an exploded perspective view of the first embodiment of holding device. It comprises a holding means, shown generally at 10. The holding means 10 comprises two clamping elements 12, 14, which are displaceable from one another along an axis 15, the axis 15 being substantially parallel, in use, to the axis 54. The clamping element 12 is part annular, having an external arcuate wall 16 and an internal arcuate wall 18. The internal arcuate wall 18 has, at its lower end, a radially inwardly extending lip 19, the lip 19 being substantially perpendicular to the arcuate wall 18 and shaped so as to engage with a radial face of the sprocket (not shown). The arcuate wall 18 also has a formation, in the form of an inwardly facing tooth 20, shaped so as to engage with a recess between two adjacent teeth on a toothed section of the sprocket. The clamping element 12 is also provided with an adjustable abutment means in the form of a pair of adjusting bolts 21. The adjusting bolts 21 have substantially flat heads with knurled circumferential walls to allow for manual adjustment of the distance between the lip 19 of the clamping element 12 and the clamping element 14, so that the device can be used on varying thicknesses of sprockets. The adjusting bolts 21 should be adjusted so that they are level with each other, thereby providing an even surface.

The clamping element 14 is also part annular and has a downwardly extending lip 22 with an inwardly facing arcuate wall 23 and an external arcuate wall 24. The lip 22 is shaped so as to substantially engage with an internal annular wall of the sprocket. Extending generally perpendicularly downwardly of the clamping element 14, towards the clamping element 12, is a locating pin 26. The locating pin 26 is a cylindrical rod (although other shapes may be used), and assists in maintaining alignment of the clamping elements 12, 14 relative to each other. The pin 26 engages in a bore 28 on the clamping element 12, when the clamping elements 12, 14 are aligned on top of each other. The clamping element 12 has an axially extending externally threaded bolt 32, which extends towards the clamping element 14. The clamping element 14 has an aperture 30 through which bolt 32 extends. The pin 26 and the bolt 32 together ensure that the clamping elements 12, 14 align correctly with respect to each other, thus providing good engagement with the sprocket. A knob 36, with a threaded portion 38 is engaged with the screw thread on the bolt 32 and can be tightened to urge the clamping element 12, 14 towards one another and grip the sprocket. The knob 36 is shaped so as to provide an easily grippable surface for turning by a user.

The bolt 32 has an internally threaded bore 34, which extends its full length, to the lower surface of the clamping element 12. An engaging means is provided in the form of a screw or threaded pin 40, engaging the screw thread in the bore 34 of the bolt 32, and having a conical tip 42. The pin 40 has a knurled knob 44 to facilitate insertion and threading of the pin 40 into the internally threaded bore 34. The length of the pin 40 is such that it protrude from the lower surface of the clamping element 12.

Figure 4:
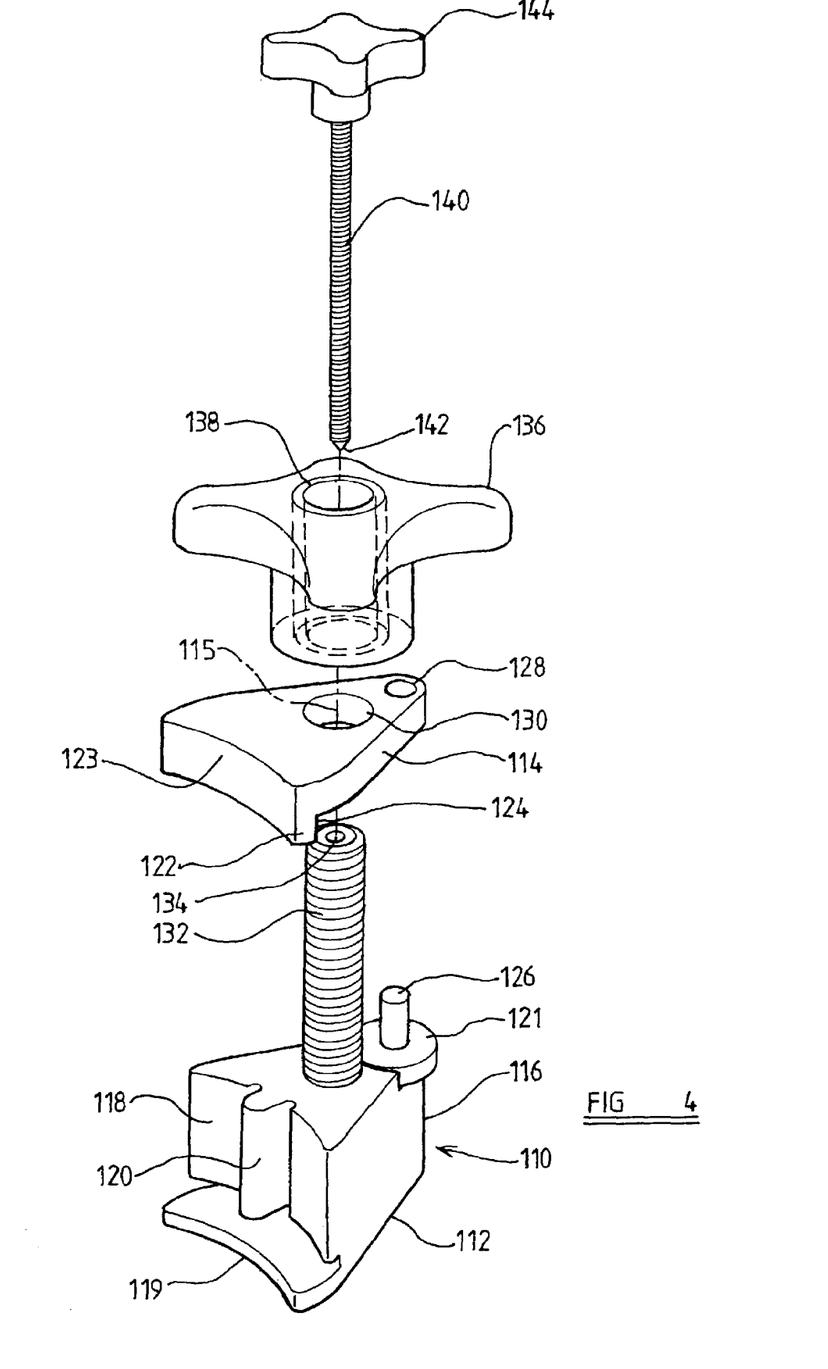
FIG. 4 is an exploded perspective view of a second embodiment of holding device in accordance with the invention.

Referring now to FIG. 4 there is shown a second embodiment of a holding device in accordance with the present invention. Similar parts of the holding device shown in FIG. 2 have the same reference numerals as those of the holding device shown in FIG. 1, with the addition of 100.

The holding device shown in FIG. 4 is a compact version of the holding device shown in FIG. 2. Firstly, the locating pin 26 and adjusting bolts 21 have been combined to provide an adjusting bolt 121 with a locating pin 126 extending upwardly from the flat head of the adjusting bolt 121. The locating pin 126 assists in maintaining alignment of the clamping elements 112, 114. The locating pin 126 engages in the bore 128 on the clamping element 114, when the clamping elements 112, 114 are aligned on top of each other. Secondly, the sides of both clamping elements 112, 114, parallel to the axis 115, taper towards one another as they extend away from the internal arcuate wall 118. Finally, the knurled knob 44 has been replaced with a knob 144, similar to the knobs 36, 136, to facilitate easier tightening of the threaded pin 140.

Figure 5:
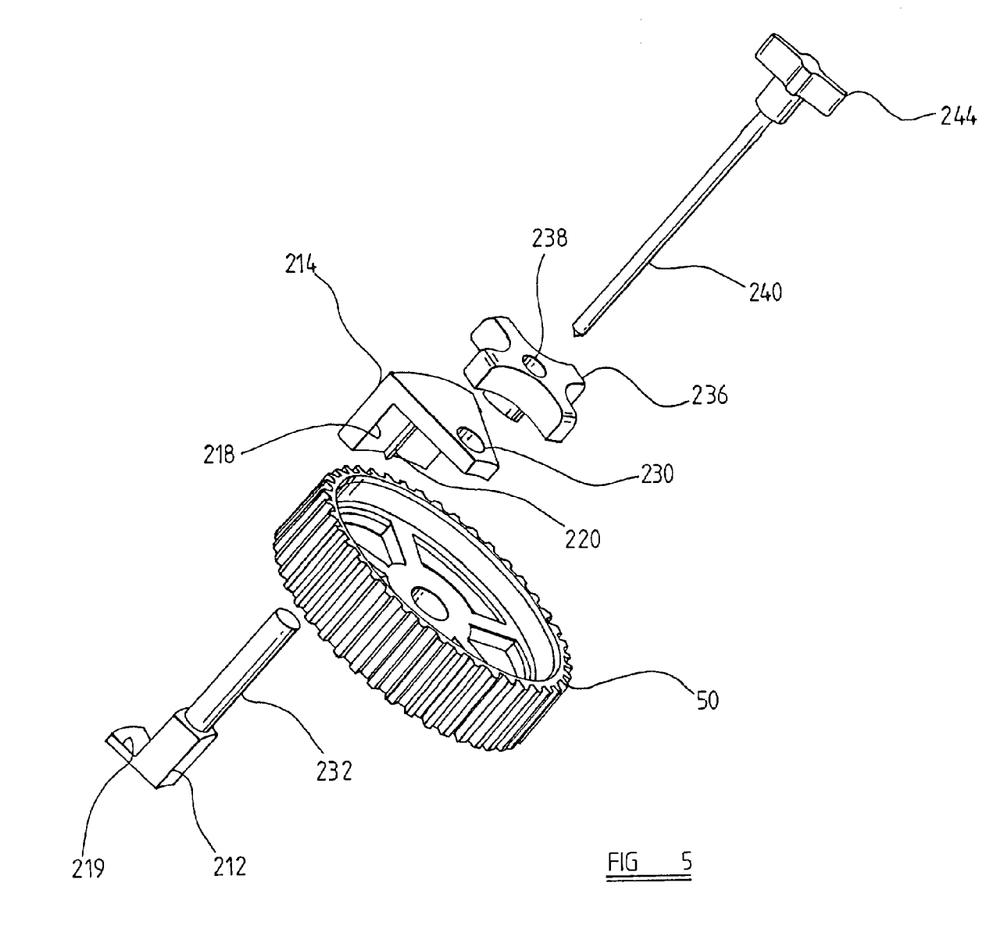
FIG. 5 is an exploded view of a third embodiment of holding device in accordance with the invention.
Figure 6:
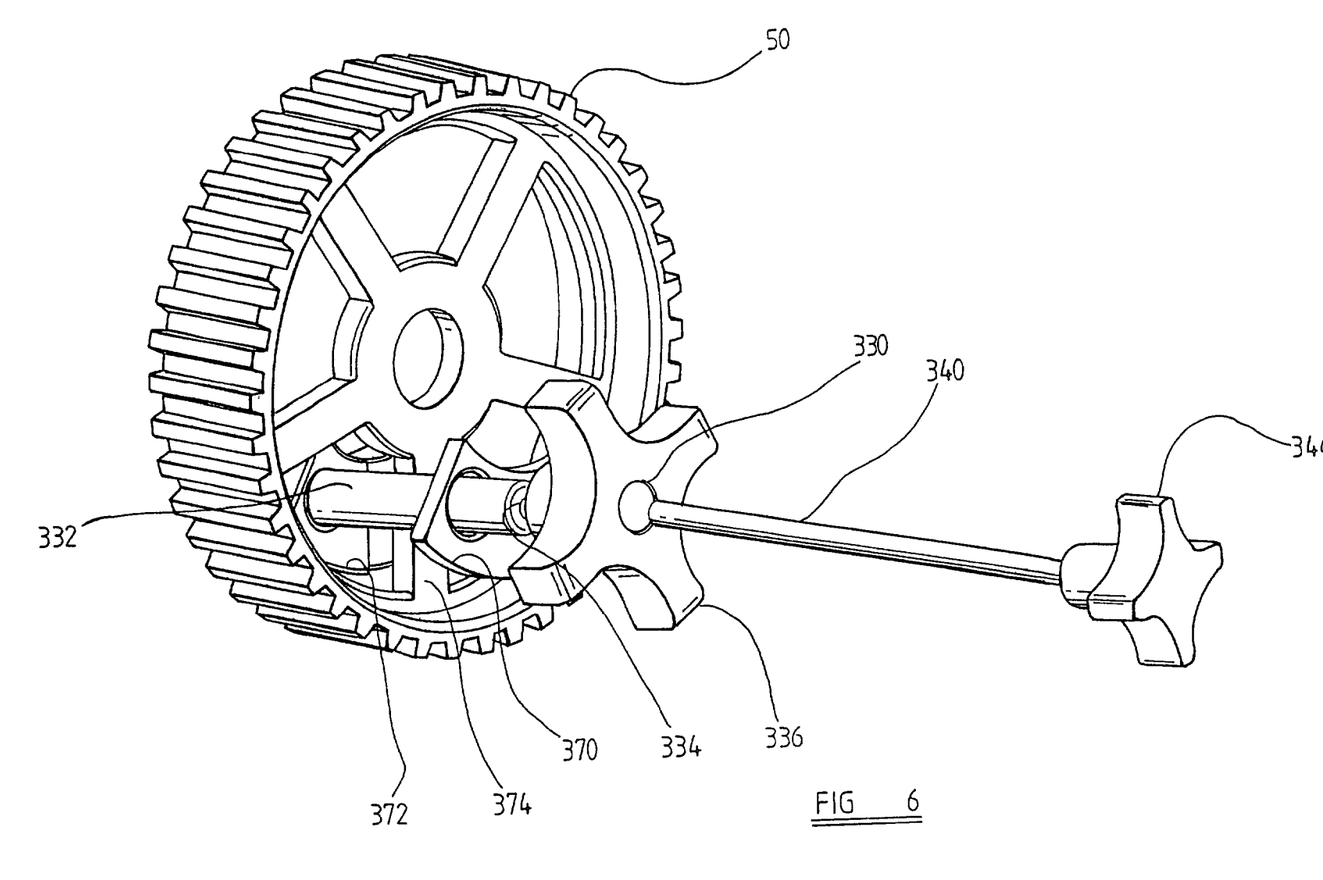
FIG. 6 is an exploded view of a fourth embodiment of holding device in accordance with the invention.
Figure 7:
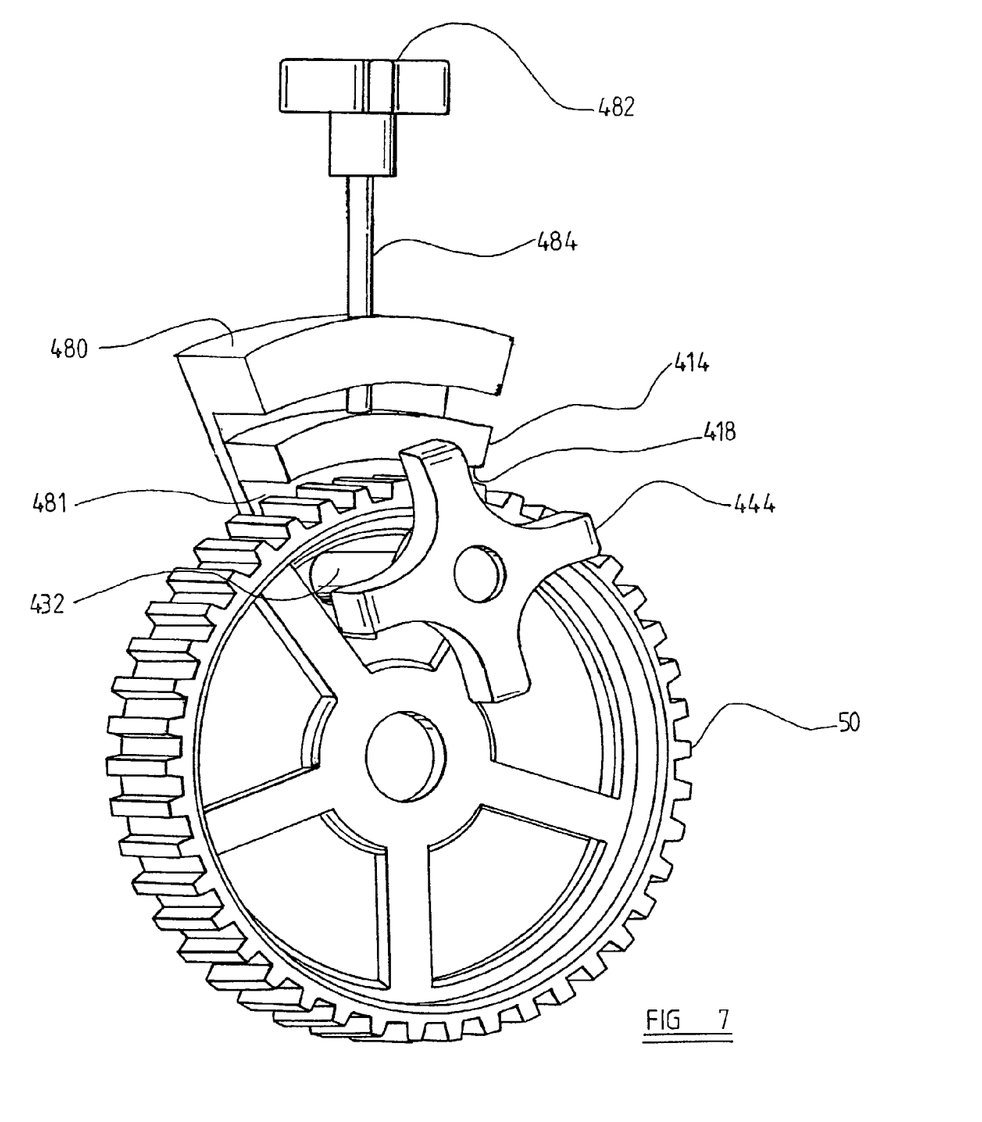
FIG. 7 is a perspective view of a fifth embodiment of holding device in accordance with the invention.

FIGS. 5, 6 and 7 show further embodiments of holding devices in accordance with the present invention. Similar parts of the holding devices shown in FIGS. 5, 6 and 7 have the same reference numerals as those of the holding device shown in FIG. 1, with the addition of 200, 300 and 400 respectively.

FIG. 5 shows a holding device similar to that of FIG. 1, i.e. circumferential movement of the holding device relative to the sprocket 50 is inhibited by clamping elements 212, 214, which clamp the sprocket 50 therebetween. However, the embodiment shown in FIG. 5 differs from the holding device of FIG. 1 in that the bolt 232, knob 236 and pin 240 pass between adjacent spokes of the sprocket 50, within the envelope of the sprocket 50.

FIG. 6 is a similar embodiment to FIG. 5, in that the pin 340, knob 336 and bolt 332 pass between adjacent spokes of the sprocket 50. However, in this embodiment, circumferential movement of the holding device relative to the sprocket 50 is inhibited by clamping of the sprocket 50 with the clamping elements 370, 372. The clamping elements 370, 372 clamp a spoke 374 of the sprocket 50.

Finally, FIG. 7 shows a holding device which again is like that of FIG. 5 in that the bolt 432 passes between adjacent spokes of the sprocket 50. However, in this embodiment the sprocket 50 is clamped relative to the holding device by a clamp having a part 480 and a relatively displaceable part 414. A screw-threaded pin 484 extends through the part 480 and has threaded engagement therewith, and is turnable by a knob 484. The pin engages the part 484 which can be caused to move generally radially of the sprocket towards the periphery thereof by appropriate turning of the pin 484, to clamp the sprocket.

Referring again to FIGS. 2 and 3 there is shown the holding device in use with a rotary element in the form of a toothed sprocket 50 of a camshaft or fuel injection pump. When servicing an engine of a motor vehicle, the timing belt may need to be removed, e.g. for replacement so as prevent failure in service and hence possible engine damage, or for some other reason. It is therefore necessary to hold the sprocket 50 stationary relative to the engine block 51 whilst the timing belt is removed.

Before the device 10 can be engaged with a sprocket 50, either:

the knob 36 must be unscrewed sufficiently for the clamping elements 12, 14 to be moved far enough away from one another for the periphery of the sprocket 50 to be inserted therebetween and engaged therewith as follows; or the pin 40 and the knob 36 can be removed completely from the clamping element 14, after which the clamping elements 12, 14 are then separated from each other and engaged with the sprocket 50 as follows.

The clamping element 12 is engaged with the sprocket 50 so that the upper surface of the lip 19 engages with a lower radial face 56 of the sprocket 50 and the internal arcuate wall 18 engages with a circumferential annular wall 58 of the sprocket 50. The inwardly facing tooth 20 on the internal arcuate wall 18 engages between two adjacent teeth on the sprocket 50, thereby preventing circumferential movement of the clamping element 12 relative to the sprocket 50. The adjusting bolts 21 are adjusted so that the vertical distance between the lip 19 and the top of both of the adjusting bolts 21 is very slightly less than the thickness of the sprocket 50.

This ensures that the clamping elements 12, 14 can engage squarely and that the holding means cannot be over tightened.

The clamping element 14 is aligned with the clamping element 12 (if it has been completely removed from the device), with the downwardly extending lip 22 pointing towards the sprocket 50 and is then engaged with the adjusting bolts 21, such that the pin 26 enters into the bore 28 and the bolt 32 extends through the aperture 30. The lip 22 engages with an internal annular wall 60 of the sprocket 50, such that the holding means 10 cannot move in an axial or radial direction. The knob 36 is then threaded onto the bolt 32 to lock the clamping elements 12, 14 together. Thus the clamping elements 12, 14 hold the holding device stationary relative to the sprocket 50.

In order to hold the holding means 10 stationary relative to the engine block 51, the pin 40 is threaded into the bore 34 being turned by its knob 44 until it protrudes from the lower surface of the clamping element 12 and engages with the surface of the engine block 51. Upon such engagement, further turning of knob 44 forces the end of the pin into tighter frictional engagement with the engine block, urging the sprocket 50 away from the engine block. The conical tip 42 of the pin may slightly indent the surface of the engine block, to assist the frictional engagement in holding the device stationary relative to the block.

Once the old timing belt has been removed and a new one installed, the holding device can be removed by reversing the sequence of installation steps above.

In the device described above the clamping elements 12, 14, 112, 114 may be moulded or machined from a rigid plastics material, the adjusting bolts 21, 121, the bolts 32, 132 and the locking nuts 38, 138 may be of a steel, the screw threaded elements 36, 136 and the knob 144 are moulded from a plastics material and the knob 44 is aluminium. However, other materials and methods of manufacturing may be utilised so long as components with desirable properties are produced, capable of being utilised in the present invention.

It is also possible to exclude the inwardly facing teeth 20, 120 from the devices shown in FIGS. 1 and 2. Circumferential movement of the holding devices 10, 110 relative to the sprocket can be inhibited by providing a frictional surface coating on the internal arcuate walls 18, 118, the upper surface of the lips 19, 119 or the upper side of the clamping elements 12, 114.

Screw threaded pins 40 of different lengths may be provided to suit different distances by which they have to extend to engage with the blocks of different engines.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A device for holding a rotatable timing element of an internal combustion engine stationary against rotation relative to a fixed part of the engine, the device comprising:

a first clamping element having a tubular member projecting from a body portion, the tubular member having an externally threaded portion;

a second clamping element having an opening positioned on the first clamping element with the tubular member extending through the opening in the second clamping element;

an engagement member threadedly engaging the externally threaded portion of the tubular member whereby the engagement member may be rotated in one direction on the tubular member to move the second clamping member on the tubular member towards the body portion of the first clamping member to clamp a timing element therebetween; and a third element extending through the tubular member, adapted for axial movement into engagement with the fixed part of an engine.

2. A device according to claim 1 wherein the tubular member has an internal thread, and wherein the third element has an external thread which threadedly engages the internal thread in the tubular member.

3. A device according to claim 2 wherein the body portion of the first element has a first clamping surface and the second element has a second clamping surface, the second clamping surface moving towards the first clamping surface when the engagement member is rotated the one direction on the tubular member, and further including means on said first clamping member for adjusting the minimum spacing between the first and second clamping surfaces when the engagement member is rotated in the one direction on the tubular member.

* * * * *